United States Patent

Piegza

[15] 3,700,267
[45] Oct. 24, 1972

[54] PIVOTAL QUICK DISCONNECT FLUID FLOW COUPLING

[72] Inventor: Henry John Piegza, Clarence, N.Y.

[73] Assignee: Welding and Steel Fabrication Co. Inc., Tonawanda, N.Y.

[22] Filed: Nov. 4, 1971

[21] Appl. No.: 195,653

[52] U.S. Cl. .....................285/24, 285/84, 285/179, 285/226, 285/362, 285/DIG. 21
[51] Int. Cl. ................................................F16l 19/00
[58] Field of Search........285/24, 18, 84, 85, 61, 179, 285/362, 360, DIG. 21, 27, 38, 91, 226

[56] References Cited

UNITED STATES PATENTS

| 2,647,768 | 8/1953 | Exton | 285/84 |
| 3,154,326 | 10/1964 | Anding | 285/18 X |
| 3,298,680 | 1/1967 | Jablin | 285/18 X |
| 3,490,792 | 1/1970 | Piegza | 285/24 |

FOREIGN PATENTS OR APPLICATIONS

| 1,300,383 | 7/1969 | Germany | 285/18 |

*Primary Examiner*—Thomas F. Callaghan
*Attorney*—John B. Bean et al.

[57] ABSTRACT

An upwardly opening, generally L-shaped movable coupling part is mounted for vertical pivoting movement at one end of an elongated horizontally extending fluid conduit under the control of a fluid cylinder, and a rotary locking ring is supported on a downwardly opening, relatively stationary coupling part and operable to releasably lock open ends of the coupling parts together in vertical alignment. Guide devices serve to constrain the movable coupling part for vertical swinging movement; such devices being effective in preventing horizontal displacement of the movable coupling part due to thermal expansions/contractions of the mounting conduit. The coupling parts carry a safety device for preventing undesired unlocking rotations of the locking ring.

5 Claims, 3 Drawing Figures

Patented Oct. 24, 1972

INVENTOR.
HENRY JOHN PIEGZA

BY

Bean & Bean
ATTORNEYS

PIVOTAL QUICK DISCONNECT FLUID FLOW COUPLING

SUMMARY OF THE INVENTION

The present invention is directed towards quick disconnect couplings for fluid flow conduits.

More particularly, the present invention relates to a pivotal quick disconnect coupling having utility in removably coupling a discharge flow conduit to a downwardly exhausting stationary flow outlet, such as would be supplied with exhaust from a turbine or jet engine under test, when a minimum of space is available between the outlet and ground level or floor.

The present coupling features a stationary coupling part fixed to the flow outlet, and a generally L-shaped movable coupling part mounted for vertical movement at one end of a horizontally elongated, pivotally supported outlet flow conduit under the control of a hydraulically operated cylinder; the stationary coupling part carrying a rotary locking ring operable to lock the parts in coupled position. The movable coupling part carries a pair of guide shoes, which are supported within stationary vertically extending guide ways for the purpose of preventing horizontal displacements of the movable coupling part, such as may be occasioned by thermally induced expansions/contractions of its mounting conduit. The operating cylinder and guide shoes are fixed to a single mounting plate, which is in turn fixed to ground or other stationary surface.

Additionally, the movable coupling part carries a pneumatically operated plunger, which is adapted to be received within an aperture formed in the rotary locking ring in order to normally constrain rotation of the ring away from its locking position. A microswitch is fixed to the stationary coupling part for the purpose of preventing operation of a locking ring operator, such as a pair of pneumatic cylinders, when the plunger is in its locking position.

When the present invention is used in a test facility wherein pluralities of engines are to be tested, more than one stationary coupling part may be provided in order to permit one of such parts to be joined to an engine while another engine is being tested.

DRAWINGS

The nature and mode of operation of the present invention will now be more fully described in the following detailed description taken with the accompanying drawings wherein.

DETAILED DESCRIPTION

Figure 1:
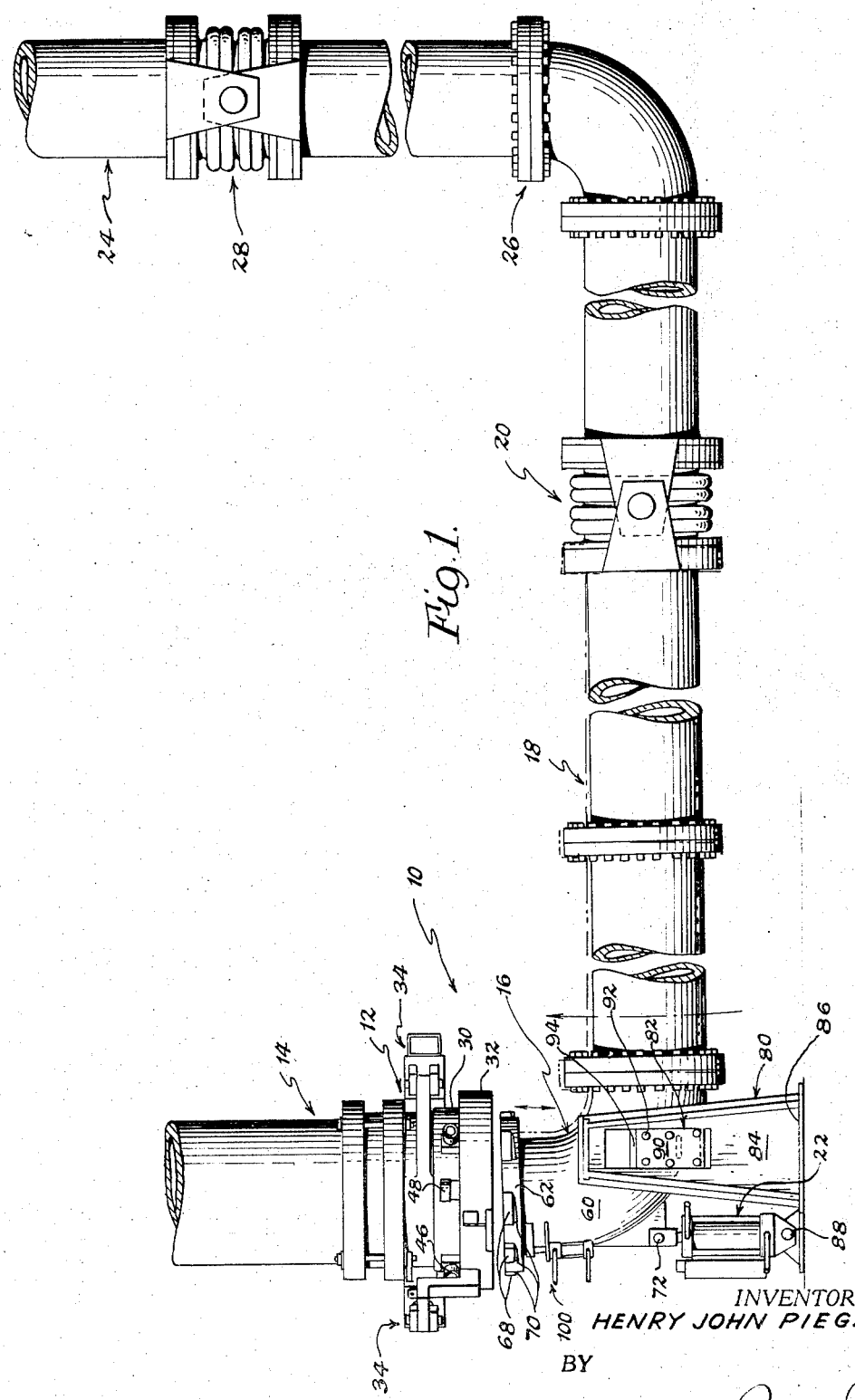
FIG. 1 is an elevational view of the coupling of the present invention showing the coupling parts in uncoupled condition.

Reference is now made particularly to FIG. 1, wherein the present coupling is generally designated as 10 and shown as including a stationary coupling part 12, which is bolt or otherwise affixed to a stationary, downwardly exhausting flow conduit or outlet 14, such as may be defined by a jet engine or turbine to be tested; and a generally L-shaped movable coupling part 16, which is bolt or otherwise affixed to one end of a horizontally elongated, discharge conduit 18, which is in turn pivotally supported by flexible bellows-pin device 20 for vertical movement through a small arc of travel under the control of a fluid cylinder 22. It will be understood that while coupling 10 has particular utility in installations wherein flow conduit 14 is defined by the downwardly directed hot gas exhaust of a turbine or jet engine, it may be employed in any installation wherein the conduit is subject to periodic repair and/or replacement and may occasion substantial expansions/contractions in the exhaust system. When thermally induced expansions/contractions are a consideration discharge conduit 18 may be connected to a stationary exhaust stack 24 via an L-shaped connecting conduit 26, which is end joined to conduit 18 by flexible bellows-pin device 20 and to stack 24 by flexible bellows-pin device 28; the pivot axes defined by devices 20 and 28 being essentially parallel such that movements of coupling part 16, conduit 18 and conduit 26 are within an essentially vertically disposed plane. Preferably, a suitable support, not shown, would be provided to support conduit 26 for horizontal sliding movements.

Figure 2:
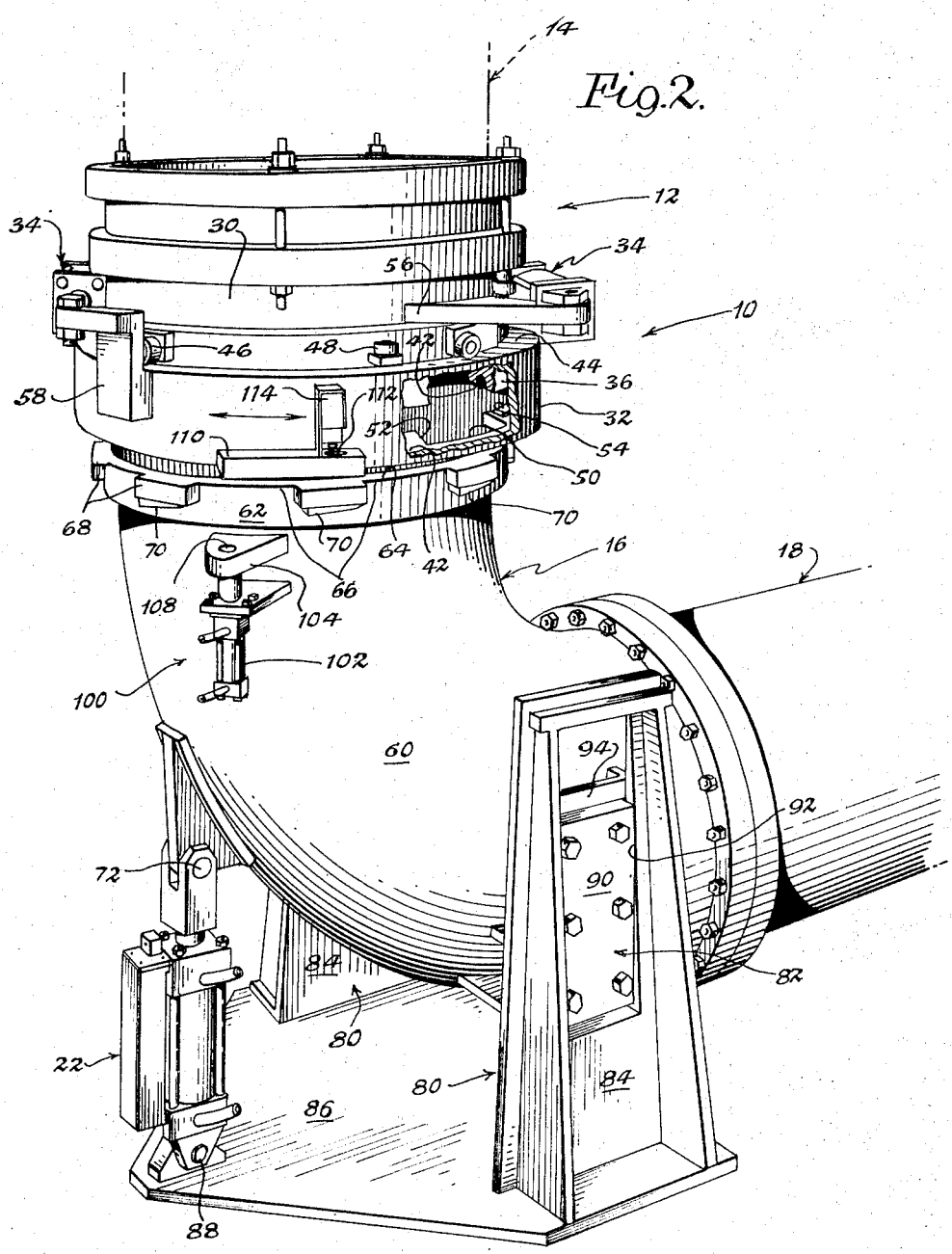
FIG. 2 is a perspective view of the coupling shown in FIG. 1 with parts broken away for the purpose of clarity.
Figure 3:
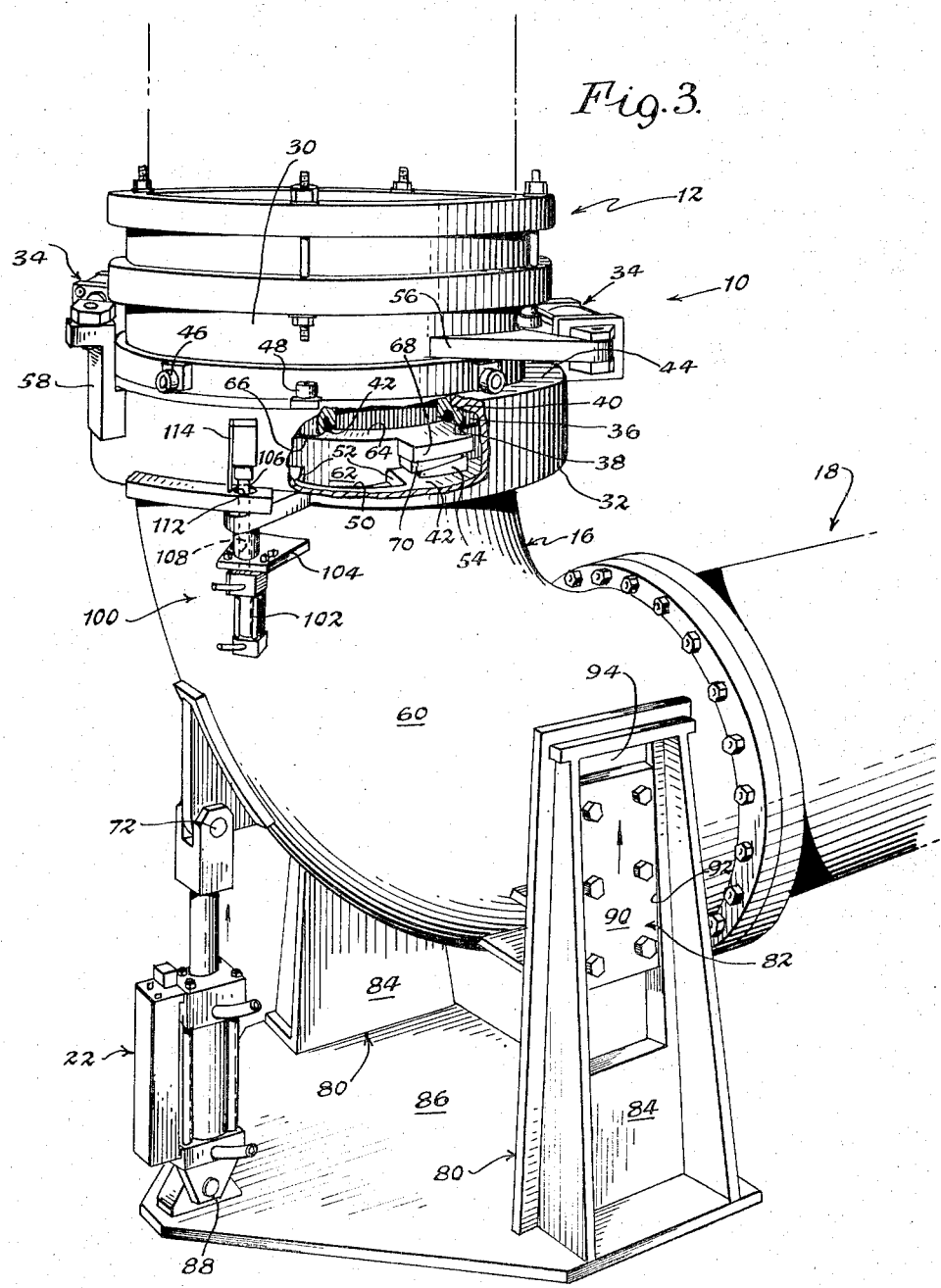
FIG. 3 is a perspective view similar to FIG. 2, but showing the coupling parts in coupled condition.

Now referring to FIGS. 2 and 3, it will be seen that coupling part 12 generally includes a mounting ring 30, which is disposable in axial alignment with conduit 14; a locking ring 32, which is adapted to be supported for rotation concentrically of mounting ring 30; and a locking ring actuating mechanism including a pair of fluid cylinder devices 34, 34.

Mounting ring 30 is best shown in FIG. 3 as including a radially extending annular flange 36, which is provided with vertically spaced, radially extending machined surfaces 38 and 40; surface 38 being preferably shaped to receive a compressible sealing gasket 42 of suitable composition. Also, locking ring 32 is best shown in FIG. 3 as being of generally U-shaped cross-section, wherein radially, inwardly extending leg portions 44 and 46 are adapted to straddle annular flange 36. The inwardly facing, radially extending surface of leg portion 44 is positioned in sliding surface engagement with flange surface 40 concentrically of mounting ring 30 by means of a plurality of mounting ring carried guide rollers 46 and locking ring carried guide rollers 48. When locking ring 32 is thus positioned, the inwardly facing, radially extending surface of leg portion 42 is maintained in a spaced, facing relationship with respect to mounting ring surface 38.

By referring to FIGS. 2 and 3, it will be seen that locking ring leg portion 42 is provided with a plurality of circumferentially spaced slot openings 50, which define intermediate portions 52 provided on the inwardly facing surfaces thereof with suitably affixed, wedge-shaped cam elements 54.

Locking ring 32 may be rotated with respect to mounting ring 30 by the above referred to fluid cylinder devices 34, 34 from a coupling unlocked position, indicated in FIG. 2, to a coupling locked position, indicated in FIG. 3. Preferably, cylinder devices 34, 34 include pneumatically operated cylinders, which are end connected by pivot pin shafts to mounting ring weldments 56 and locking ring weldments 58.

Coupling part 16 includes an L-shaped conduit section 60 and a radially extending mounting ring member 62, which is provided with a radially extending surface 64 machined to define a sealing surface adapted to cooperate with sealing gasket 42 carried on mounting ring 36. Mounting ring member 62 is additionally formed with a plurality of circumferentially spaced slot openings 66, which define intermediate portions 68 on which are mounted wedge cam surface elements 70. Fluid cylinder 22 is connected to conduit section 60 by a pivot pin connection 72.

It will be understood that, when coupling part 16 is moved upwardly upon extension of fluid cylinder 22 from the position illustrated in FIG. 2, intermediate portions 68 of mounting ring member 62 are caused to pass through locking ring slot openings 52 in order to place mounting ring sealing surface 64 adjacent sealing gasket 42 with the surfaces of wedge elements 54 and 70 disposed in a facing circumferentially spaced relationship. Thereafter, when locking ring 32 is rotated by contraction of fluid cylinders 34 into its locked position shown in FIG. 3, the surfaces of wedge elements 54 and 70 cooperate to lock coupling parts 12 and 16 together, and to force mounting ring member sealing surface 64 into operative sealing engagement with sealing gasket 42 to form an annularly arranged fluid seal between the mating coupling parts. The coupling parts may be uncoupled by reversing the operations just described.

Coupling part 16 is constrained for vertical movement in proper alignment with coupling part 12 by a pair of guide devices 80 and 80. Guide devices 80 and 80 include a pair of guide shoes, only one of which is shown in the drawings as 82, which are fixed to opposite sides of conduit section 60 and a pair of vertically extending guide ways 84 and 84, which are fixed relative to each other and to a stationary ground or floor reference by mounting plate 86. Mounting plate 86, which may be bolt or otherwise connected to the ground reference, additionally serves as a point of attachment for fluid cylinder 22, as indicated by pivot pin connection 88.

Each of shoes 82 is formed with a front block portion 90, which is edge guided for vertical sliding movement within a guide way slot 92 and a rear plate portion 94, which is arranged to engage the inner or facing surface of its associated guide way adjacent slot 92.

As will be apparent, rear plate portions cooperate with the facing inner surfaces of guide ways to constrain coupling part 16 for vertical movement within a plane vertically bisecting the coupling parts and conduit 18, such movement being otherwise difficult to achieve if sole reliance were to be placed on flexible bellows-pin device 20. Also, as will be apparent, the front block portions cooperate with the guide way slots to constrain coupling part 16 for movement within an essentially vertically disposed plane arranged to extend transversely of conduit 18. By this means, coupling part 16 is fixed against displacements in a direction lengthwise of conduit 18 and any thermally induced expansions and/or contractions of such conduit and/or connecting conduit 26 is compensated for by movements in flexible bellows-pin devices 20 and 28.

The present construction additionally provides a positive interlock device 100 for preventing unintentional unlocking rotation of locking ring 32. Interlock device 100 includes a fluid cylinder operator 102, which is fixed to conduit section 60 by a mounting-guide bracket 104 and adapted to effect vertical reciprocation of a spring biased plunger 106 (shown only in FIG. 3) within bracket bore opening 108; a receiver bracket 110, which is fixed to locking ring 32 and formed with bore opening 112; and a suitable senser, such as an electrical switch 114, which is arranged above receiver bracket 110 in alignment with its bore opening 112. As will be apparent from viewing FIG. 3, upon rotation of locking ring 32 into its coupling parts locking position, receiving bracket opening 112 is automatically moved into vertical alignment with bracket opening 108. Thereafter, operation of operator 102 will effect vertical movement of plunger 106 upwardly through receiving bracket opening 112 into operating engagement with the operator of switch 114. To prevent unintentional removal of plunger 106 from bore opening 108 in the event of failure of the fluid supply to operator 102, plunger 106 is spring biased upwardly. This requires that operator 102 must be intentionally reversed in order to lower the plunger from constraining engagement with the locking ring.

Preferably, switch 114 is connected into the control circuit, not shown, for both of cylinders 34, 34 and cylinder 22, whereby when plunger 106 is extended, both unlocking rotation of the locking ring and uncoupling movement of coupling part 16 is prevented. Even if switch 114 should fail, the presence of plunger 106 within receiving bracket opening 112 would be effective in preventing unintentional rotation of the locking ring.

I claim:

1. A quick disconnect coupling comprising in combination:

a stationary coupling part mounted in flow communication with a vertically downwardly exhausting flow outlet of a flow source means;

a generally L-shaped movable coupling part mounted in flow communication with one end of an elongated, generally horizontally extending flow receiver conduit means supported at a point remote from said coupling for at least pivotal movement within an essentially vertically disposed plane bisecting said coupling parts and said flow outlet, said coupling parts including ring members mounted on the mating ends thereof, said ring members each having sealing means;

a locking ring member of generally U-shaped cross-section supported on one of said ring members for rotational movement between coupling unlocked and coupling locked positions, said locking ring member having first and second leg portions straddling said one ring member in a direction axially of its associated coupling part, said first leg portion having alternately spaced first cam members and axially through slot openings arranged circumferentially thereof, said first cam members being disposed in facing relation to said second leg portion, and the other of said ring members having second cam members spaced circumferentially thereof such that said second cam members may pass essentially axially inwardly of said locking ring member through said slot openings when disposed in circumferential alignment therewith, said second cam members facing in a direction away from the mating end of the coupling part with which said other ring member is associated, said locking ring member when said mating ends of said coupling parts are brought together to place said ring members in an axially aligned relationship and said second cam members inwardly of said locking ring member being adapted to be rotated with respect to said ring members between said coupling unlocked and coupling locked positions to force said first and second cam members into operative engagement whereby said sealing means are forced into sealing engagement to form an annularly arranged flow seal between the mating ends of said coupling parts;

operating means for rotating said locking ring member between said positions thereof;

ground affixed guide means for constraining the ring member of said movable coupling part for movement along an essentially vertical path of travel whereby to guidingly maintain said second cam members and said slot openings in circumferential alignment when said mating ends of said coupling parts are brought together and said locking ring is in said coupling unlocked position; and ground affixed control means for vertically moving said movable coupling part to bring together said mating ends of said coupling parts.

2. A coupling according to claim 1, wherein said coupling additionally includes locking means for selectively preventing rotation of said locking ring member between said positions thereof.

3. A coupling according to claim 2, wherein said locking ring member is supported on the ring member of said stationary coupling part.

4. A coupling according to claim 3, wherein said locking means includes a plunger operated by a fluid cylinder, means for supporting said cylinder on said movable coupling part to arrange said plunger for reciprocating movements along a path essentially parallel to said path of travel, an aperture defined by said locking ring member, said aperture being alignable with said path of plunger travel when said locking ring member is in said coupling locked position for receipt of said plunger therewithin, said plunger when received within said aperture constraining said locking ring member from rotation away from said locking position, and responsive means carried by said stationary coupling part, said responsive means being responsive to receipt of said plunger within said aperture for preventing operation of said operating means.

5. A coupling according to claim 1, wherein said control means is a fluid operated cylinder having opposite ends thereof pivotally interconnected to said movable coupling part and a mounting plate, said mounting plate being ground affixed, and said guide means includes a pair of guide shoes fixed to extend vertically from adjacent oppositely facing surfaces of said movable coupling part and a pair of guideways fixed to said mounting plate, said guide shoes cooperating with said guideways to constrain said movable coupling part as aforesaid.

* * * * *